Oct. 30, 1928.
J. SMITH, JR
1,689,898
VEHICLE TIRE RIM
Filed June 13, 1927
2 Sheets-Sheet 1
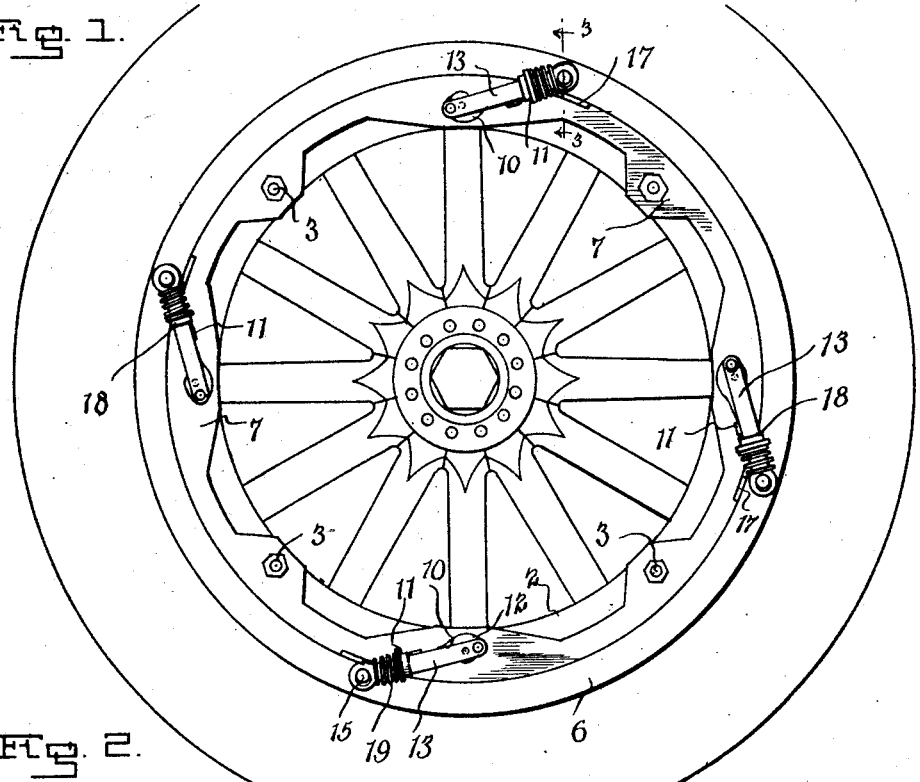
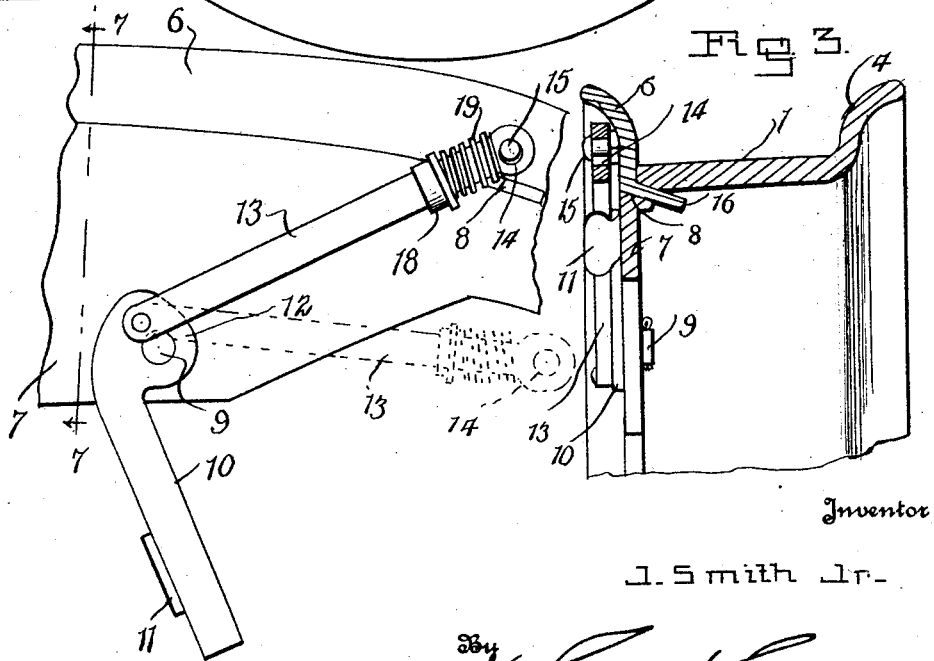
Inventor
J. Smith Jr.
By Lacy & Lacy, Attorneys Oct. 30, 1928.  
J. SMITH, JR  
VEHICLE TIRE RIM  
Filed June 13, 1927

Inventor  
J. Smith Jr.  
By Lacey & Lacey, Attorneys

Patented Oct. 30, 1928.

1,689,898

UNITED STATES PATENT OFFICE.

JOEL SMITH, JR., OF BYRON, OKLAHOMA.

VEHICLE TIRE RIM.

Application filed June 13, 1927. Serial No. 198,602.

The present invention is directed to improvements in vehicle tire rims.

The primary object of the invention is to provide a rim of this type constructed and arranged in such manner that the tire can be readily applied or removed therefrom.

Another object of the invention is to provide a device of this kind so constructed that the side flange will be held firmly and positively in place, but can be easily and quickly removed in order that a tire can be removed or replaced.

In the accompanying drawings:

Figure 1 is a side elevation of the device.

Figure 2 is a fragmentary enlarged side elevation showing the locking lever in position to permit removal of the removable flange.

Figure 3 is a sectional view on line 3—3 of Figure 1.

Figure 4:
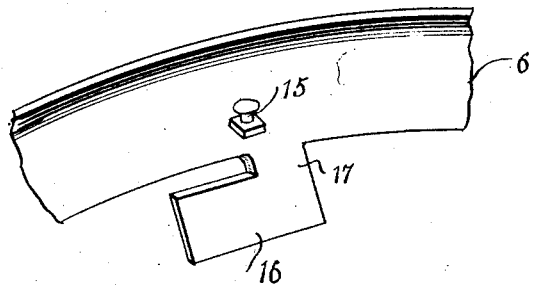
Figure 4 is a fragmentary perspective view of the removable flange.
Figure 5:
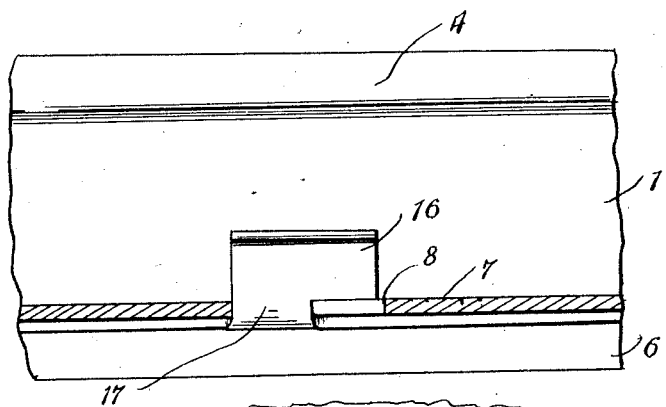
Figure 5 is a fragmentary bottom plan view of the rim, showing the locking head in a position to permit removal of the flange.

Referring to the drawings, 1 designates a rim which is secured to the usual wheel felly 2 by bolts 3, said rim having an integral side flange 4 upon one edge, the opposite edge thereof having a circumferential shoulder 5, the purpose of which will be later explained. A removable flange 6 is employed and is adapted to engage the shoulder 5 for a limited circumferential sliding movement thereon when the same is being removed or replaced. The rim 1 is also provided with inturned sections 7, preferably four in number and in which are provided slots 8, and further with posts 9, and pivotally connected to said posts are levers 10, the free ends of which carry thumb pieces 11.

Having one of their ends pivoted eccentrically to the heads 12 of the levers are links 13, the other ends of said links having openings 14 therein adapted to freely engage the headed pins 15 carried by the flange 6.

Figure 6:
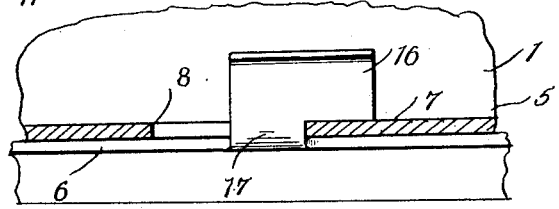
Figure 6 is a similar view showing the locking head in its operative position.
Figure 7:
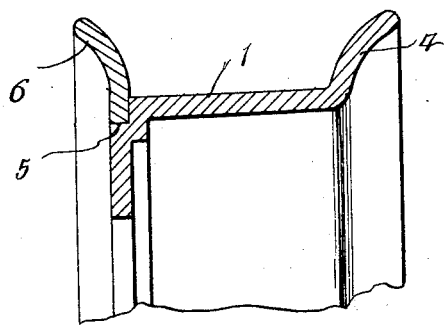
Figure 7 is a sectional view on line 7—7 of Figure 2.

The flange 6 is provided with heads 16 which are integrally connected to the flange 6 by necks 17, said necks being adapted to engage in the slots 8, and as shown in Figure 6, the head is so located that it cannot pass through the associated slots, thus holding the flange engaged with the rim 1.

When the links 13 are in the position as shown in Figure 1, the heads 16 are interlocked with the sections 7 of the rim, at which time the thumb pieces 11 lie against the links 13 and owing to the fact that the links are eccentrically connected therewith accidental swinging of the levers is prevented. When it is desired to remove the flange 6 it is only necessary to swing the levers 10 to the position as shown in Figure 2, whereupon the links will be moved in a direction to effect circumferential movement of the flange 6 in order that the heads 16 will coincide with the slots 8 in order that they may pass therethrough. When the flange has been thus moved the links are disengaged from the pins 15 and the flange can then be removed. After a tire has been placed upon the rim, the flange is placed upon the shoulder 5 and the links engaged with the pins 15, whereupon the levers 10 are swung outwardly or towards the links, thus drawing the links rearwardly in order that the necks 17 will slide in the slots 8 until the heads are firmly engaged with the inner surface of the sections 7.

In order to prevent the levers 10 from opening accidentally collars 19 are slidably mounted on the links 13, there being coil springs 19 encircling the links which serve to hold the collars engaged with the free ends of the levers 10. Owing to the pressure of the spring 19 the collars 18 may be slid outwardly to release the ends of the levers 10 when it is desired to remove the rim.

Having thus described the invention, I claim:

A securing device for a removable flange of a vehicle wheel rim, comprising levers pivotally connected to the rim, pins carried by the flange, links having one of their ends pivotally connected to the levers, the other ends of the links having openings therein for pivotally and detachably engaging the pins, and heads carried by the flange and movable into and out of locking engagement with the rim upon actuation of the levers.

In testimony whereof I affix my signature.

JOEL SMITH, Jr. [L. S.]